United States Patent [19]

Robinson et al.

[11] 4,340,271
[45] Jul. 20, 1982

[54] INTERNAL BODY MOUNTED SYSTEM FOR ISOLATION OF, IN ONE DEGREE OF FREEDOM, A BEAM PROJECTED FROM AN OPTICAL SYSTEM WHICH IS SUBJECT TO ROTATIONAL VIBRATION

[75] Inventors: Curtiss W. Robinson; Wilbur D. Clingman, both of Seattle, Wash.

[73] Assignee: The Boeing Company, Seattle, Wash.

[21] Appl. No.: 137,530

[22] Filed: Apr. 4, 1980

[51] Int. Cl.³ .............................................. G02B 23/00
[52] U.S. Cl. .................................. 350/16; 356/149; 356/254
[58] Field of Search .................. 350/16, 486; 356/149, 356/153, 250, 254, 255

[56] References Cited

U.S. PATENT DOCUMENTS 4,027,540  6/1977  Allard .............................. 356/149 X

FOREIGN PATENT DOCUMENTS 1136054 12/1968 United Kingdom .................. 350/16
1333591 10/1973 United Kingdom .................. 350/16

*Primary Examiner*—John K. Corbin
*Assistant Examiner*—Matthew W. Koren
*Attorney, Agent, or Firm*—Ronald E. Suter; Bernard A. Donahue

[57] ABSTRACT

The system includes an inertial body on which is mounted a mirror, which together are mounted for rotation by a gimbal bearing element. The gimbal bearing element is part of a base system which further includes a light beam source, such as a laser. The mirror is positioned on the inertial body so that it is at an angle of 45° relative to the axis of the gimbal bearing element. The inertial body, which can be represented by a dumbbell-shaped equivalent mass, is oriented so that the path of the light beam from the light source is coincident with the gimbal axis, i.e. such that the light beam strikes the mirror. A yaw-like disturbance, i.e. a rotational vibration about the Z coordinate axis, affecting the base system, and hence the light beam source and gimbal bearing element as well, is converted into a rotational movement of the inertial body and the mirror about the axis of percussion, which, in the embodiment shown, causes a rotation of the reflected beam about the Y coordinate axis. The reflected beam impinges on a second mirror, which is positioned at a 90° angle relative to the mirror on the inertial body. The rotation of the reflected beam compensates for the effect of the disturbance about the Z axis on the beam, so that the beam reflected from the second mirror remains steady in the far field.

4 Claims, 4 Drawing Figures

4,340,271

INTERNAL BODY MOUNTED SYSTEM FOR ISOLATION OF, IN ONE DEGREE OF FREEDOM, A BEAM PROJECTED FROM AN OPTICAL SYSTEM WHICH IS SUBJECT TO ROTATIONAL VIBRATION

BACKGROUND OF THE INVENTION

This invention relates generally to the art of compensation or isolation of the effect of rotational vibration of an optical system, and more specifically concerns apparatus which introduces a counter disturbance to compensate, in one degree of freedom, for the effect of rotational vibration on a light beam of the optical system which produces the light beam.

Certain optical systems which include a beam generating device, such as, for instance, a laser, have been used to illuminate or target objects located a significant distance, i.e. in the far field, from the optical system. Other optical systems which do not include a beam generating device, such as telescopes, are, on the other hand, used to locate or observe given objects.

When the optical system is mounted on a steady base, such as the earth, the generated beam or the light from the object in the far field will remain steady, for accurate targeting or viewing. However, the optical system in many applications will be mounted on a vehicle or in an aircraft, which are subject to vibration. When the support base of the optical system, e.g. the frame of an aircraft, vibrates, the optical system, typically supported by one or more sets of gimbal axes, will also vibrate, which, in a beam targeting apparatus, for instance, causes the generated beam to vibrate in the far field. This results in the designated object tending to blur, an undesirable effect.

Generally, the attempts to correct such beam vibration have been directed towards stabilizing the platform carrying the optical system upon the gimbal axes. This is, however, in practice difficult to accomplish. Such correction systems are complex and expensive, and do not provide uniformly successful results.

Accordingly, an object of the present invention is to provide a compensation/isolation system which results in the output beam being unaffected by rotational vibration, about one axis, of the optical system producing the beam.

It is a further object of the present invention to provide such a system which is designed to operate when the optical system is vibrating with a support base, and which does not depend on totally isolating the optical system from the vibrating support base.

It is an additional object of the present invention to provide such a system which operates in such a manner that there is little, if any, lag between the vibration of the optics and the corrective action of the system.

It is a further object of the present invention to provide such a system which may be used with similar or equivalent systems for compensation of rotational vibration in all three coordinate axes of a representative system.

SUMMARY OF THE INVENTION

Accordingly, the present invention is adapted for use with an optical system which is supported by a base system such as an aircraft frame. The optical system may be either of the class which generates and transmits a light beam to the far field or receives a light beam from the far field, such as a telescope. The apparatus is for compensating, in one degree of freedom, i.e. along one coordinate axis, for the effect on the light beam by a rotational vibration which affects the base system and the optical system. The apparatus includes an inertial body means, upon which is mounted a first mirror means at an angle of 45° relative to the path of the light beam. The first mirror means is positioned so that the light beam is incident thereon. Means are further included which are connected to the base system and hence which is subject to the rotational vibration for supporting the inertial body means for rotation about a support axis which is coincident with the path of the light beam incident on the first mirror means and which is orthogonal to the axis about which the rotational vibration occurs. Also included is a second mirror means which is positioned relative to the first mirror means such that a light beam which reflects off the first mirror means is reflected off the second mirror means to the far field. In operation, the mirror body, including the first mirror means, rotates about the support axis in response to the rotational vibration, resulting in the beam which is reflected from the first mirror means rotating in a plane normal to the support axis. The amount of rotation is determined by the distribution of the mass of the inertial body selected to compensate for the rotational vibration, so that the beam reflected from the second mirror means remains steady in the far field.

DESCRIPTION OF THE DRAWINGS

A more thorough understanding of the invention may be obtained by a study of the following detailed description taken in connection with the accompanying drawings in which.

DESCRIPTION OF THE PREFERRED EMBODIMENT

Figure 1:
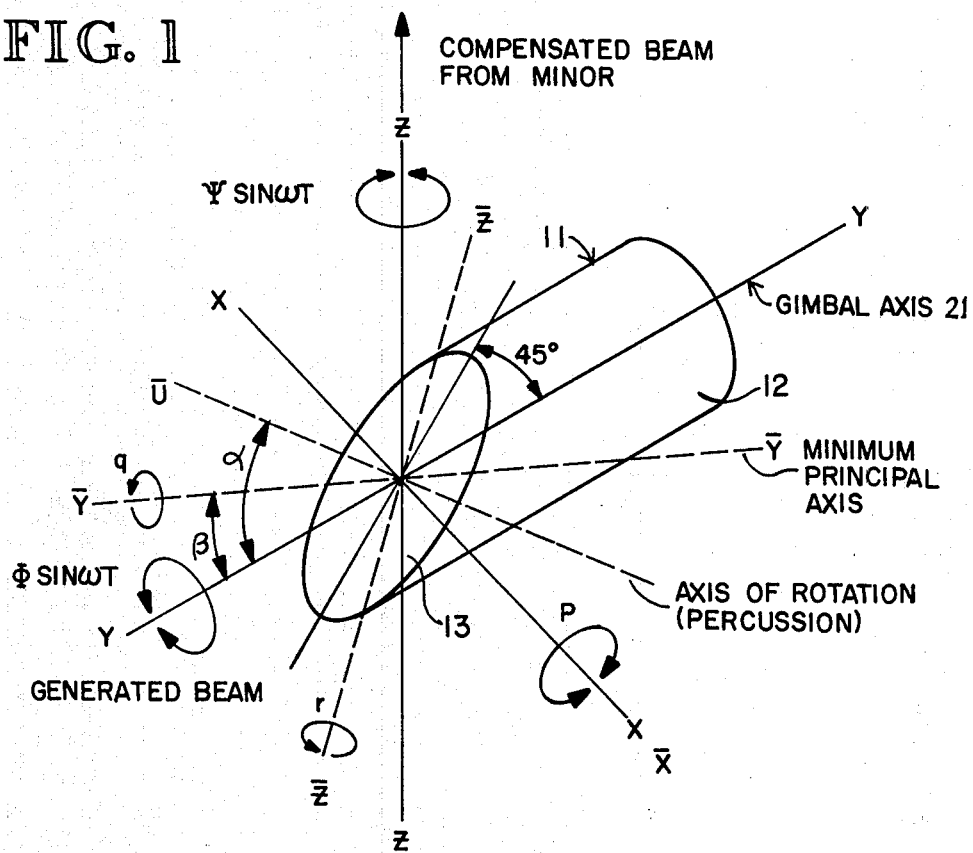
FIG. 1 is a simplified perspective drawing showing the mirror body structure of the present invention in relation to three coordinate axes and the principal axes of the mirror body.

Referring to FIG. 1, a combination of a mirror 13 and an inertial body 12, referred to hereinafter together as a mirror body, is shown in generalized form at 11, relative to conventional X, Y Z coordinates. Mirror 13 is positioned on inertial body 12 so that it is at a 45° angle relative to the Y coordinate axis shown, and mirror body 11 is supported, as explained hereinafter, so that it is rotatable about a gimbal bearing axis 21, which is coincident with the Y coordinate axis. The mirror body 11 is positioned relative to an input from a light beam source so that the gimbal axis 21 is also coincident with the path of the input beam. The light beam source in turn typically forms a part of a base system, such as an airframe in an aircraft.

Figure 2:
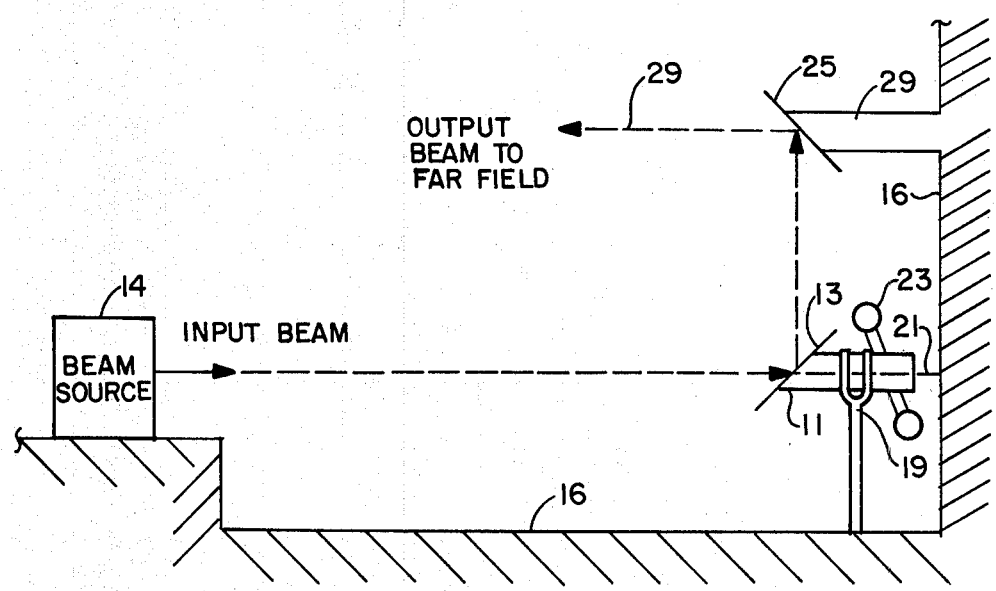
FIG. 2 is an elevational view showing in simplified form the structure of the present invention and a light beam source relative to a base system which supports them.
Figure 4:
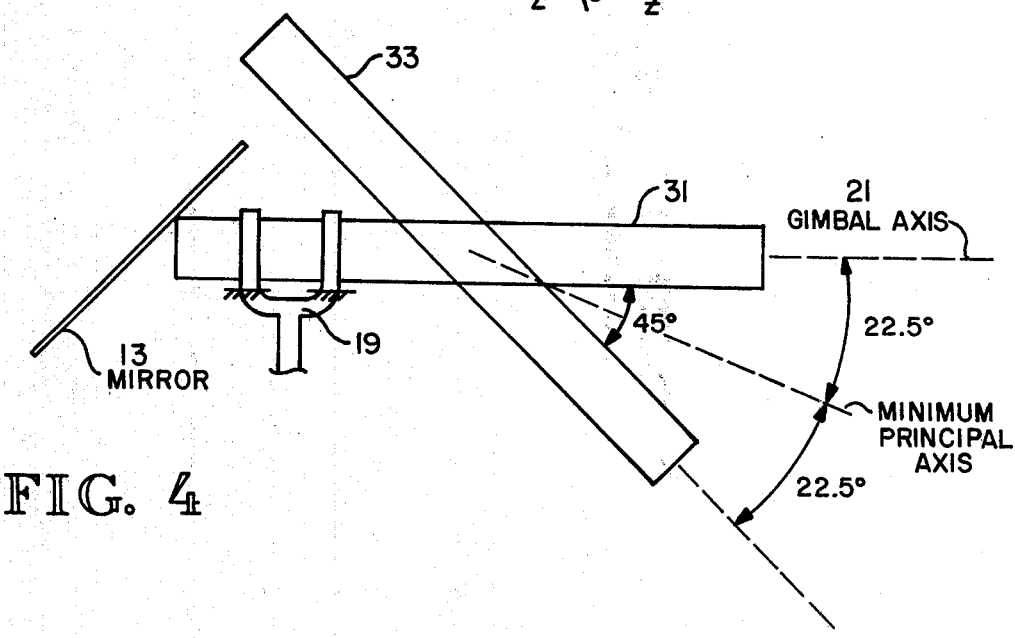
FIG. 4 is a side elevational view showing a portion of the system of FIG. 2.

The system of FIG. 1 is used to compensate, in one degree of freedom, for the effect of rotational vibration of the base system on the input beam produced by the light beam source. Referring to FIG. 2, a representative optical system is shown, which includes a light beam source 14 supported integral with a base system referenced generally at 16. The base system can be virtually any support structure which is subject to rotational vibration, such as a moving vehicle, or the airframe in an airplane. Such a base system 16, and hence, the beam source 14, is subject to rotational vibration along one or more of its X, Y and Z coordinate axes. The vibration along each coordinate axis of the base system must be separately corrected in order to produce a stable output beam in the far field. The apparatus shown in FIG. 1 and in more detail in FIGS. 2 and 4 is designed to correct for rotational vibration about one coordinate axis alone, e.g. the Z axis, and thus, the following explanation of the apparatus and its operation will relate to compensation of rotational vibration affecting the base system about the Z axis alone. Additional similar or equivalent systems could of course be used to correct for vibration about the other coordinate axes.

As mentioned above, the system of FIGS. 1 and 2 is oriented so that the input beam from beam soure 14 is coincident with the Y coordinate axis of the system and the gimbal axis 21, for compensation of a rotational disturbance about the Z coordinate axis. If left uncompensated, a rotational disturbance about the Z coordinate axis affecting the base system will result in the beam from source 14 vibrating about the Z axis, and the target of the beam in the far field tends to blur accordingly.

The device shown in FIGS. 1 and 2 compensates for a rotational vibration affecting the base system 16 about the Z coordinate axis and produces a steady output beam, so that the projected image of the beam in the far field remains steady. This is accomplished not by a system of gimbals to steady the light source 14, but rather by introducing a counter disturbance to the beam produced by the light source. The counter disturbance is just sufficient to compensate for the effect of the vibration of the base system.

Referring still to FIG. 2, mirror body 11 is mounted to the base system 16 by a support bearing shown generally at 19. Support bearing 19 in the embodiment shown takes the form of a Y or yoke shaped support which forms part of base system 16, and is hence subject to the rotational vibration which affects the base system. Located in the two arms of the yoke support are conventional bearings which support the mirror body 11 for rotation about gimbal axis 21. Support 19 forms part of a gimbal axis system which in total would provide support for compensating systems on all three coordinate axes.

In operation, a rotational vibration about the Z coordinate axis, affecting the base system 16 and support 19 will result in an angular rotation of mirror body 11, and hence the mirror 13, as well, about gimbal axis 21, which, as explained above, is coincident with the Y coordinate axis.

The amount of angular rotation depends upon the inertial configuration of mirror body 11. The inertial mass of mirror body 11 is shown representationally in FIG. 2 by a dumbbell-shaped mass 23. The angle of the dumbbell mass 23 relative to the gimbal axis 21 will determine the amount of rotation of mirror body 11, and hence, the amount of corrective disturbance introduced to the beam, as explained in more detail hereinafter.

The apparatus of the present invention also includes a second mirror 25 which is positioned directly above mirror 13. The plane of mirror 25 is nominally at a 90° angle relative to the plane of mirror 13 in its nominal, at rest, position, and is positioned so that an input beam from source 14 is reflected off mirror 13 to mirror 25, which in turn reflects the beam back in the direction of the input beam, to the far field. The beam from mirror 25 is hereinafter referred to as an output beam.

In operation, a yaw-like action, i.e. a vibrational rotation about the Z axis, acts on mirror body 11 through base system 16 and the support 19. The mass of the inertial body 12, which is shown by the equivalent dumbbell shaped mass in FIG. 2, effectively converts the input disturbance about the Z coordinate axis into a rotation of the mirror body 11 about gimbal axis 21. The amount of the rotation, as indicated above, depends both on the magnitude of the input disturbance and the mass distribution of the inertial body.

The rotation of mirror body 11 results in a corresponding correction disturbance to the beam reflected off mirror 13. Thus, as mirror 13 rotates through a specified angle, caused by the input disturbance about the Z coordinate axis, the beam reflected from mirror 13 will also rotate correspondingly in a plane normal to the Y axis. The plane through which the reflected beam rotates is thus orthogonal to the plane of the input disturbance. The inertial mass of the mirror body 11, in the simplest configuration of the present invention, is adjusted until the rotation or mirror body 11 is sufficient to result in a reflected beam which is rotated just the right amount to compensate for the input disturbance.

The beam reflected from mirror 13 then impinges on mirror 25, which reflects the beam out to the far field. In the absence of any vibration about the Z axis, the beam reflected off mirror 25 will remain steady on a target in the far field along an output beam path 29. An uncompensated vibration about the Z axis would have the effect of vibrating the path of the output beam about the Z axis. By rotating the mirror 13, however, the reflected beam from mirror 13 is rotated through a given angle, so that when the beam is in turn reflected from mirror 25, it remains steady along beam path 29 and hence remains steady in the far field.

With respect to the system shown in FIG. 2, the angle of the dumbbell-shaped mass 23 representing the mass of the mirror body 11, assuming mirror 13 to be massless, is approximately 45° in the basic configuration of the system, which results in a one-to-one compensation. The present system, however, does have the significant advantage that the mass of mirror body 11 may be adjusted to accurately compensate for rotational vibration, even when optical magnification elements form part of the system, i.e. when magnification is present between the far field and the mirror body 11. The magnification elements in effect magnify the rotational vibration, so that the amount of compensating correction must be correspondingly increased. This is accomplished by effectively adjusting the mass distribution of the mirror body, i.e. in FIG. 2 by adjusting the angle of dumbbell 23, until the effect of the magnification is also fully compensated.

In a modification of the system of FIG. 2, mirror 25 may also be mounted on an inertial body which in turn may be mounted for rotation along a gimbal axis by a bearing support which forms a part of base system 16. Such a structure is not necessary when correction about only one coordinate axis is required. However, it is useful when similar or equivalent systems to that described in detail above are used on each coordinate axis, to compensate for intersystem coupling effects.

Figure 3:
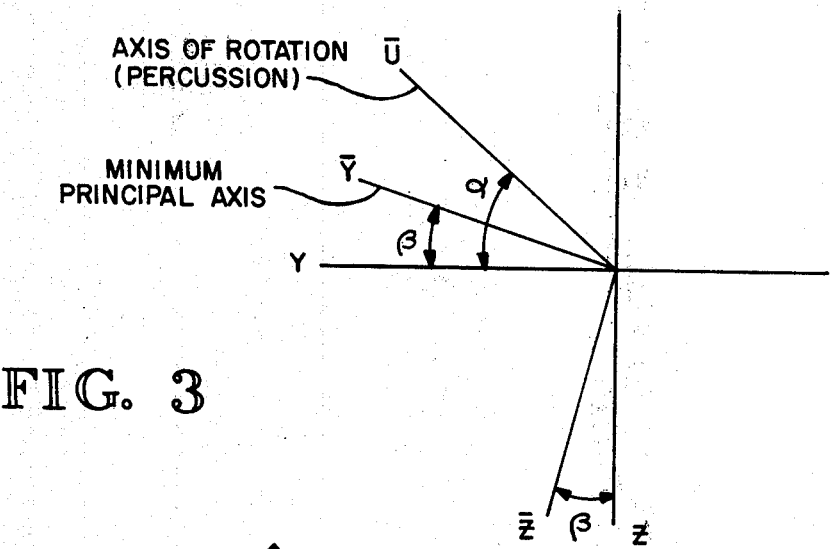
FIG. 3 is a diagram showing certain axes of the mirror body of FIG. 1 in the YZ plane.

Referring now to FIGS. 1 and 3, the particular angle of the minimum principal axis of the inertial body 11, shown generally as angle $\beta$ in FIG. 1, will, from principles of mechanics, determine the axis of rotation, i.e. percussion, of the mirror body 11. The angle of this percussion axis, which lies in the plane of the Y and Z coordinate axes, is shown generally as angle $\alpha$ in FIG. 1. This is shown most clearly in FIG. 3. The tangent of this particular angle $\alpha$ is referred to as the gain of the system. The gain of the system is the determinant for the amount of compensation of the system. As indicated above, a gain of one is proper when there is no additional magnification optics in the system, such as the system shown in FIG. 2. When magnification optics are present, the gain of the system must be increased accordingly.

The various angular relationships of the elements of the system are calculated as follows: For the system shown, with the apparatus having a mirror body principal axis oriented at an angle $\beta$, and having a gain of 1, an input disturbance of the system about the Z axis may be shown as $Dis_Z = \Psi \sin \omega t$, and the corrective movement of the reflected beam about the Y axis may be shown as $Cor_Y = \Phi \sin \omega t$. Again, it is assumed that, for the purposes of this explanation, that there is no rotational vibration about the X and Y coordinate axes.

If it is desired to have the apparatus compensate exactly for the disturbance about the Z axis, then the system must be arranged so that $Cor_Y = Dis_Z$. From FIG. 1, it is clear that $Cor_Y$ and $Dis_Z$ are related. A disturbance about the Z coordinate axis and $Cor_Y$ results in a vector rotation $\overline{U}$ about the axis of percussion. $Dis_Z = \overline{U} \sin \alpha$ and $Cor_Y = \overline{U} \cos \alpha$. Thus, $Dis_Z/Cor_Y = \tan \alpha$, which is the gain of the system.

Thus, if the correction about the Y axis is to just compensate for the input disturbance in the Z axis, then $\tan \alpha$ must equal 1, and $\alpha$ must equal 45°. Referring still to FIG. 1, the angular velocities about the principal axes of mirror body 11 $\overline{Y}$, $\overline{Z}$ and $\overline{X}$ respectively, are labeled q, r and p. The principal axes of the mirror body are aligned to compensate for the rotational vibration of the input beam introduced by the input disturbance. Thus, $q = \overline{U} \cos (\alpha - \beta)$ and $r = -\overline{U} \sin (\alpha - \beta)$. From above, and since $\alpha$ and $\beta$ are not time dependent, we see that $$r/q = \dot{r}/\dot{q} = -\tan (\alpha - \beta). \tag{1}$$

From Euler's equations of motion for inertial bodies having principal axes $\overline{X}, \overline{Y}, \overline{Z}$, where the I terms refer to the moments of inertia of the body about those principal axes, and $N_X$ $N_Y$ and $N_Z$ refer to the moments about those axes, $$I_X \dot{p} = qr(I_Y - I_Z) + N_X \tag{2}$$

$$I_Y \dot{q} = pr(I_Z - I_X) + N_Y \tag{3}$$

$$I_Z \dot{r} = pq(I_X - I_Y) + N_Z \tag{4}$$

Since it has been assumed that there is no rotation about the X coordinate axis, then $p = \dot{p} = 0$, since there is no movement about the X axis, and thus:

$$qr(I_Y - I_Z) + N_X = 0 \tag{5}$$

$$I_Y \dot{q} = N_Y \text{ and } I_Z \dot{r} = N_Z \tag{6}, \text{ and}$$

since the moment about the Y axis is also zero, since it has been assumed that there is no friction on this bearing, $$N_Y \cos \beta + N_Z \sin \beta = 0$$

$$N_Y/N_Z = -\tan \beta \text{ and } I_Y \dot{q}/I_Z \dot{r} = -\tan \beta$$

thus:

$$\dot{q}/\dot{r} = -\tan \beta (I_Z/I_Y) \tag{7}$$

Combining equations 1 and 7 from above, $$I_Y/I_Z = \tan \beta [\tan (\alpha - \beta)] \tag{8}$$

Assuming for example, that in a particular case, $\beta$ of the system is 22.5°, then for an $\alpha$ of 45, $\alpha - \beta = 22.5°$. The tangent of 22.5° is 0.4142, so that $I_Y/I_Z = (0.4142)^2 = 0.17157$. Thus, for an angle $\alpha$ of 45°, and an angle $\beta$ of 22.5°, the mass of the mirror body compensating system must be adjusted until the ratio of the inertia of the body about the Y axis to the inertia of the body about the Z axis is 0.17157.

In FIG. 2, the equivalent dumbbell-shaped mass 23 is oriented at a 45° angle. The actual size of the mirror body, as well as the size of the mirror, can vary widely, as long as the inertia of the body is correctly oriented. The principles of the present invention are thus not dependent on a particular size of device. Assuming however, for purposes of illustration, a three inch diameter mirror, the equivalent dumbbell, for a massless mirror, is illustrated in FIG. 4. The mirror 13 is secured to one end of a steel rod 31, which is twelve inches long and one inch in diameter, in the embodiment shown. Supporting the rod 31 for rotation is a Y-shaped support 19, as described above. The rod 31 rotates about gimbal axis 21. Another steel rod 33, also twelve inches long and one inch in diameter, is secured to steel rod 31 at about midlength thereof. The rod 33 is oriented so that there is a 45° angle between the gimbal axis 21 and the longitudinal axis of rod 33. The forward half of the rod 33 extends above the rod 31, while the rearward half extends below rod 31. With such an arrangement, the minimum principle axis of the mirror body is located midway between the gimbal axis 21 and the longitudinal axis of the rod 33, or 22.5° from the gimbal axis.

As mentioned above, the angle $\alpha$ of the system, which is the inclination of the axis of rotation (percussion) in the YZ plane (FIG. 3), will determine the ratio of output disturbance to input disturbance. Furthermore, $Cor_Y/Dis_Z = \tan \alpha$, which is equal to the system gain. With an angle of $\alpha$ other than 45°, there is a net difference between output correction and input disturbance. This resulting ratio is used to compensate for the magnification factor of a system of expander or condenser optics between the mirror body and the far field, as explained above.

Further, the apparatus can be made gyro-stabilized by mounting a single axis rate integrating gyro on the mirror body with its null momentum vector along the axis of percussion and its precession axis normal to the plane containing the input and output beams and the axis of percussion.

The error signal from the gyro is routed to a conventional torque motor on the Y axis gimbal supporting the mirror body. The effect of the torque motor is to make the mirror body an active, rather than a passive, mass and to effectively make the inertia of the mirror body appear must larger than it is.

It should be understood that the above-described compensation system is useful for isolation of the objective image of a telescope system from vibration of a system, as well as for the isolation of an output beam from the effects of vibration of a base system which includes the source of the beam. Also, although the apparatus shown and described is capable of compensating for vibration rotation in only one degree of freedom, it should be clearly understood that similar or equivalent devices can be used to compensate completely for rotational vibration along all the major coordinate axes of the vibrating base system.

Although an exemplary embodiment of the invention has been disclosed herein for purposes of illustration, it should be understood that various changes, modifications and substitutions may be incorporated in such embodiment without departing from the spirit of the invention as defined by the claims which follow.

What is claimed is:

1. An apparatus, for use with an optical system which is supported by a base system such as an aircraft frame, and which generates and transmits a light beam to the far field or receives a light beam from the far field, for compensating, in one degree of freedome, for the effect on the light beam by a rotational vibration which affects the base system and the optical system, said apparatus comprising:
   a. inertial body means, upon which is mounted a first mirror means at an angle of 45° relative to the path of the light beam, which is incident thereon;
   b. means connected to the base system, and hence subject to the rotational vibration, for supporting said inertial body means for rotation about a support axis which is coincident with the path of the light beam incident on said first mirror means and which is orthogonal to the axis about which the rotational vibration occurs; and
   c. second mirror means positioned relative to said first mirror means such that a light beam reflected off said first mirror means will be reflected off said second mirror means to the far field, wherein in operation said mirror body, with said first mirror means, rotates about the support axis in response to the rotational vibration, resulting in the beam reflected from said first mirror means rotating in a plane normal to said support axis, the amount of rotation being determined by the distribution of the mass of the inertial body selected to compensate for the rotational vibration, so that the beam reflected from said second mirror means remains steady in the far field.

2. An apparatus of claim 1, wherein said first and second mirror means are oriented relative to each other such that the light beam travels through an angle of 180° and has an exit path nominally parallel to its entry path.

3. The apparatus of claim 1, wherein the gain of the apparatus is variable, by adjustment of the mass of the inertial body, wherein a change in gain changes the amount of compensation introduced into the system.

4. The apparatus of claim 1, wherein the apparatus is compatible with similar or equivalent apparatus to correct vibration about any three orthogonal axes of the optical system.

* * * * *